United States Patent [19]

Daifuku et al.

[11] Patent Number: 4,957,833
[45] Date of Patent: Sep. 18, 1990

[54] NON-AQUEOUS LIQUID ELECTROLYTE CELL

[75] Inventors: Hideharu Daifuku, Akishima; Takashi Kitamura, Hachiohji; Takahiro Kawagoe, Tokorozawa, all of Japan

[73] Assignee: Bridgestone Corporation, Tokyo, Japan

[21] Appl. No.: 446,424

[22] Filed: Dec. 5, 1989

[30] Foreign Application Priority Data

Dec. 23, 1988 [JP] Japan .................................. 63-327355
Dec. 23, 1988 [JP] Japan .................................. 63-327356

[51] Int. Cl.⁵ ............................................. H01M 6/14
[52] U.S. Cl. ...................................... 429/197; 429/213
[58] Field of Search ............... 429/194, 196, 197, 213, 429/198, 218

[56] References Cited

U.S. PATENT DOCUMENTS 3,853,627 12/1974 Lehmann et al. ................ 429/197 X
3,945,848 3/1976 Dey et al. ............................ 429/198
4,060,673 11/1977 Dey .................................. 429/194 X

*Primary Examiner*—Anthony Skapars
*Attorney, Agent, or Firm*—Oblon, Spivak, McClelland, Maier & Neustadt

[57] ABSTRACT

A non-aqueous liquid electrolyte cell comprising a positive electrode having an active material of conductive organic polymer, typically polyaniline on a support, a negative electrode having an active material of lithium or lithium alloy, and a non-aqueous electrolyte solution exhibits improved performance when the electrolyte solution contains an electrolyte in a non-aqueous solvent mixture of a non-cyclic carbonate and a cyclic carbonate.

9 Claims, 2 Drawing Sheets

NON-AQUEOUS LIQUID ELECTROLYTE CELL

This invention relates to a non-aqueous liquid electrolyte cell using an organic electroconductive polymer, typically polyaniline as the positive electrode active material and lithium or lithium alloy as the negative electrode active material.

BACKGROUND OF THE INVENTION

It is well known in the art that organic electroconductive polymers such as polyaniline, polyacetylene, polypyrole, and polythiophene are light weight, flexible and capable of taking in ion species. It was proposed to apply such polymers to the battery, particularly as active material for positive and negative electrodes. Secondary cells using such polymers as the electrode active material are known as high energy density cells having efficient charge/discharge cycles. In particular, polyaniline is recognized excellent as the electrode active material with respect to cell performance factors including cycle life and self-discharge as compared with other organic conductive polymers. In fact, polyaniline cells are on the verge of entering commercial manufacture. Non-aqueous liquid electrolyte secondary cells using polyaniline as the positive electrode active material, however, still have a problem that they are not necessarily satisfactory in cycle life, float life, and self-discharge life when they are used at a relatively high discharge capacity.

In the efforts to overcome the above-mentioned drawbacks of a secondary cell having a conductive polymer as the electrode active material, the inventors found that one of the major causes for the cell to lose its performance during operation at a relatively high discharge capacity is the stability of the electrolyte liquid, particularly of the solvent under application of an increased voltage. We proposed in Japanese Patent Application No. 151939/1988, U.S. patent application Ser. No. 07/361,301 and West German Patent Application No. 39 18 963.5 a non-aqueous liquid electrolyte secondary cell having a practically satisfactory cell life for operation at a relatively high discharge capacity wherein the electrolyte solvent is a solvent mixture of propylene carbonate and ethylene carbonate which is stable with an increased voltage applied and in which an electrolyte such as $LiClO_4$ and $LiBF_4$ is well soluble and the positive electrode is constructed from a member or current collector of a ferrite stainless steel. However, since cyclic carbonates such as propylene carbonate and ethylene carbonate are viscous, an electrolyte liquid based on such a cyclic carbonate solvent shows a reduced ionic conduction at low temperatures, sometimes failing to provide a sufficient discharge capacity depending on the magnitude of a discharge current.

These cells having a conductive organic polymer as the positive electrode active material often use metallic lithium as the negative electrode active material for energy density. Secondary cells using metallic lithium as the sole negative electrode suffer from a problem that lithium dendrites grow on the negative electrode to penetrate through the separator between the positive and negative electrodes, causing shortcircuiting or a problem that lithium precipitates in fine powder form, pulverizing or passivating the negative electrode. In either case, the cells have a substantially reduced cycle life.

One prior art approach for overcoming these drawbacks is to use a lithium alloy with aluminum, lead, or indium as the negative electrode, with some problems left unsolved. When a lithium-aluminum alloy is used as the negative electrode active material, no dendrite grows, but the negative electrode can be pulverized or disintegrated during repeated charge/discharge cycles. The slow diffusion of lithium in the alpha phase of the alloy will result in a low Coulomb efficiency. Use of a lithium lead alloy has a problem that disintegration of the electrode by repeated charge/discharge operation occurs to a greater extent than with the lithium-aluminum alloy. The coulombic efficiency is undesirably low with lithium-lead alloys having a low lithium content. Lithium-indium alloy is impractical despite high coulombic efficiency because indium is expensive. In addition, negative electrodes of these alloys have potentials 0.3 to 0.8 volts more positive than metallic lithium and an increased weight which is undesirable in view of energy density.

SUMMARY OF THE INVENTION

Therefore, an object of the present invention is provide a stable and reliable non-aqueous liquid electrolyte cell having a high voltage and a high energy density which has a practically satisfactory cell life on use at a substantial discharge capacity, maintains a sufficient discharge capacity at low temperatures, and shows improved charge/discharge properties when constructed as a secondary cell.

We have discovered that non-cyclic carbonates such as dimethyl carbonate, diethyl carbonate, dipropyl carbonate, and dibutyl carbonate are stable at an increased voltage and sufficiently less viscous to provide a relatively high ionic conduction at low temperatures; and that a non-aqueous solvent mixture as a liquid electrolyte for high-performance cells is obtained by combining the non-cyclic carbonates with the previously mentioned cyclic carbonates such as propylene carbonate and ethylene carbonate which are stable at an increased voltage and in which an electrolyte such as $LiBF_4$ is well soluble. Using a liquid electrolyte having an electrolyte dissolved in such a non-aqueous solvent mixture, a non-aqueous liquid electrolyte cell can be fabricated in which the positive electrode active material is composed of a conductive organic polymer and the negative electrode active material is composed of lithium or lithium alloy. The resulting cell has a practically satisfactory cell life on use at a substantial discharge capacity of more than 80 Ah/kg and maintains a sufficient discharge capacity at low temperatures below 0° C.

Great advantages are obtained particularly when $LiBF_4$, $LiClO_4$, $LiPF_6$, $LiCF_3SO_3$, or $LiAsF_6$ is dissolved in the non-aqueous solvent mixture to form an electrolyte solution. For metallic lithium as the negative electrode active material, the growth of dendrite otherwise occurring with the metallic lithium electrode can be controlled. For lithium alloys as the negative electrode active material, the electrode disintegration and coulombic efficiency loss can be inhibited. In either case, there results a stable and reliable non-aqueous liquid electrolyte secondary cell having a high voltage, a high energy density, and an increased charge/ discharge cycle life.

According to the present invention, there is provided a non-aqueous liquid electrolyte cell comprising a positive electrode having an electroconductive organic polymer as a positive electrode active material, a negative electrode having lithium or a lithium alloy as a negative electrode active material, and a non-aqueous electrolyte solution, characterized in that the non-aqueous electrolyte solution contains an electrolyte in a non-aqueous solvent mixture of a non-cyclic carbonate and a cyclic carbonate.

BRIEF DESCRIPTION OF THE DRAWINGS

The above and other objects, features, and advantages of the invention will be better understood from the following description taken in conjunction with the accompanying drawings, in which.

DETAILED DESCRIPTION OF THE INVENTION

Figure 1:
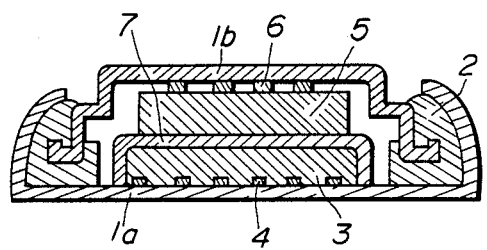
FIG. 1 is a schematic cross section of a coin type secondary cell.

The non-aqueous liquid electrolyte cell of the present invention uses an organic electroconductive polymer as the positive electrode active material as described above. The organic conductive polymer used herein is not particularly limited. It may be selected from the group consisting of polyaniline, polyacetylene, polypyrrole, polythiophene, and poly-para-phenylene, with the polyaniline being preferred. Preferred among the polyanilines are chemical polyanilines prepared by chemical oxidative polymerization using a chemical oxidizing agent such as $(NH_4)_2S_2O_8$, $FeCl_3$, $K_2Cr_2O_7$, and $KMnO_4$ and electrochemical polyanilines prepared by electrolytic oxidative polymerization. Most preferred are those polyanilines which are prepared by electrolytic oxidative polymerization from an electrolytic solution containing 0.01 to 5 mol/liter, preferably 0.5 to 3 mol/liter of aniline and 0.02 to 10 mol/liter, preferably 1 to 6 mol/liter of acid. The acid used in the solution for electrolytic polymerization includes hydrofluoric acid HF, hydrochloric acid HCl, sulfuric acid $H_2SO_4$, nitric acid $HNO_3$, perchloric acid $HClO_4$, tetrafluoroboric acid $HBF_4$, and acetic acid $CH_3COOH$, with the perchloric acid and tetrafluoroboric acid being most preferred.

The positive electrode of the cell of the invention has an active material in the form of the above-described polymer. The positive electrode further includes a member in direct or indirect contact with the active material. The positive electrode-constructing member is typically a current collector. The member is formed of a corrosion resistant conductive material, with stainless steel being preferred for corrosion resistance and cost. Useful stainless steels contain at least 16%, preferably 16 to 45% by weight of chromium and at least 0.5%, preferably 0.75 to 7% by weight of molybdenum and/or less than 5% by weight of nickel, preferably substantially free of nickel. These stainless steels are effective in minimizing self-decomposition of the electrolyte solution on use at a high voltage, thus allowing the cell to exert its performance to a greater extent.

Examples of the stainless steel include austenite stainless steels such as SUS 316; austenite-ferrite stainless steels such as SUS 329; ferrite stainless steels such as SUS 430, SUS 434, SUS 436, SUS 444, and SUS 447; and martensite stainless steels such as SUS 429, SUS 431, and SUS 440. Preferred among them are ferrite stainless steels such as SUS 430, SUS 444, and SUS 447.

When a stainless steel substrate is used as a positive electrode collector, it may preferably be of mesh shape because of enhanced integration with the organic conductive polymer active material. The mesh shape includes net, metal mesh, punched metal, foamed metal, and expanded metal. Where the organic conductive polymer as the active material is formed by electrolytic oxidative polymerization as previously described, the stainless steel substrate may be used as a polymerizing electrode on which the organic conductive polymer is deposited, leading to direct manufacture of a unitary positive electrode in which the organic conductive polymer as the active material is integrated with the stainless steel substrate as the collector.

The cell of the invention uses lithium or a lithium alloy as the negative electrode active material. The negative electrode of metallic lithium is advantageous in view of energy density although lithium alloys with other metals are also contemplated herein. Useful lithium alloys are alloys of lithium with a metal or metals of Group IIa, IIb, IIIa, IVa or Va. Lithium alloys with one or more metals of Al, In, Sn, Pb, Bi, Cd, and Zn are particularly preferred, with Li-Al alloys being most preferred.

The non-aqueous liquid electrolyte cell of the present invention is of a construction wherein an electrolytic solution of an electrolyte in a non-aqueous solvent mixture of a non-cyclic carbonate and a cyclic carbonate intervenes between the above-defined positive and negative electrodes.

The non-cyclic carbonate is preferably selected from the group consisting of dimethyl carbonate, diethyl carbonate, dipropyl carbonate, dibutyl carbonate, diphenyl carbonate, and a mixture of two or more of them. Diethyl carbonate is especially preferred because its melting point to boiling point relationship allows for a wide service temperature range. These non-cyclic carbonates have a low dielectric constant, but a sufficiently low viscosity to allow for diffusion of ions in the solution, contributing to an increase in conductivity. The non-cyclic carbonates are unlikely to degrade at high voltages and thus effective in maintaining the solvent mixture stable during charge/discharge operation at a high voltage of at least 3 volts.

The cyclic carbonate is preferably selected from the group consisting of ethylene carbonate, propylene carbonate, butylene carbonate, and a mixture of two or more of them although any cyclic carbonates of a molecular structure having a five-membered ring containing a carbonate group are contemplated herein. The cyclic carbonates having a high dielectric constant are effective in promoting dissociation of the solute or electrolyte.

The non-aqueous solvent mixture may either consist of two components, non-cyclic and cyclic carbonates, or be a mixture of three or more components in which an additional non-aqueous solvent(s) is added to non-cyclic and cyclic carbonates. The additional non-aqueous solvent is not critical and may be selected from those solvents commonly used for lithium cell electrolyte solutions although a solvent having a relatively high polarity is preferred. Preferred, non-limiting examples of the additional non-aqueous solvent include lactones such as γ-butyrolactone, 2-methyl-γ-butyrolactone, and N-methyloxazoline; ethers such as 1,2-dimethoxyethane, methyldiglyme, ethylmonoglyme, ethyldiglyme, butyldiglyme, 1,3-dioxolane, 2-methyldioxolane, 4-methyldioxolane, 1,4-dioxane, tetrahydrofuran, 2-methyltetrahydrofuran, 2,5-dimethyltetrahydrofuran, furan, and 2-methylfuran; phosphates such as triethyl phosphate; borates such as triethyl borate; sulfur compounds such as sulfolane, 2,4-dimethylsulfolane, 3-methylsulfolane, and dimethyl sulfoxide; nitriles such as acetonitrile, benzonitrile, and propionitrile; amides such as dimethylformamide and dimethylacetamide; dimethyl sulfate, nitromethane, nitrobenzene, dichloroethane, dichloromethane, and mixtures of two or more of the foregoing solvents. Preferred among these non-aqueous solvents are those having a relatively high dielectric constant, for example, lactones such as $\gamma$-butyrolactone and 2-methyl-$\gamma$-butyrolactone, and 3-methylsulfolane.

The non-cyclic carbonate is blended in the non-aqueous solvent mixture for the purpose of increasing the ionic conduction of the electrolyte solution at low temperatures. The amount of the non-cyclic carbonate blended in the solvent mixture is not particularly limited although it is preferably from 5 to 80% by weight, more preferably from 10 to 70% by weight. A solvent mixture containing less than 5% by weight of a non-cyclic carbonate will sometimes result in a cell having poor discharge performance at low temperatures. It will become rather difficult to dissolve the electrolyte to a high concentration in a solvent mixture containing more than 80% by weight of a non-cyclic carbonate because the non-cyclic carbonate has a relatively low dielectric constant. In turn, the cyclic carbonate has a high dielectric constant and allows the electrolyte to be dissolved to a high concentration as previously mentioned. The amount of the cyclic carbonate blended in the solvent mixture is preferably from 5 to 95% by weight, more preferably from 10 to 95% by weight. Less than 5% by weight of the cyclic carbonate would be too small to dissolve the electrolyte to a high concentration whereas more than 95% by weight of the cyclic carbonate would form a too viscous solvent mixture, often resulting in a loss of discharge performance at low temperatures. The proportion of non-cyclic carbonate to cyclic carbonate preferably ranges from 1/5 to 5/1, more preferably from 1/3 to 3/1 in weight ratio. The total weight of non-cyclic and cyclic carbonates should preferably be at least 30%, more preferably at least 50% by weight of the entire solvent mixture. Secondary cells having a conductive organic polymer as the electrode active material require the presence of the electrolyte in a high concentration since charge/discharge reactions take place through doping and undoping of electrolyte ions. Then the ability of the solvent to dissolve the electrolyte therein is an important factor in obtaining a high performance cell if it is desired to fabricate a secondary cell.

The electrolyte which is dissolved in the non-aqueous solvent mixture to form the electrolyte solution used in the cell of the present invention is a compound of an anion and a cation. Some illustrative, non-limiting examples of the electrolyte are $LiPF_6$, $LiSbF_6$, $LiAsF_6$, $LiClO_4$, $LiI$, $LiBr$, $LiCl$, $NaPF_6$, $NaSbF_6$, $NaAsF_6$, $NaClO_4$, $NaI$, $KPF_6$, $KSbF_6$, $KAsF_6$, $KClO_4$, $LiBF_4$, $LiAlCl_4$, $LiHF_2$, $LiSCN$, $LiCF_3SO_3$, $ZnSO_4$, $ZnI_2$, $ZnBr_2$, $Al_2(SO_4)_3$, $AlCl_3$, $AlBr_3$, $AlI_3$, $KSCN$, $LiSO_3CS_2$, $(n-C_4H_7)NAsF_6$, $(n-C_4H_7)_4NPF_6$, $(n-C_4H_7)_4NClO_4$, $(n-C_4H_7)_4NBF_4$, $(C_2H_5)NClO_4$, and $(n-C_4H_7)_4NI$. Preferred among them are $LiPF_6$, $LiAsF_6$, $LiBF_4$, $LiCF_3SO_3$, and $LiClO_4$. The use of $LiPF_6$ or $LiAsF_6$ electrolyte in a secondary cell is effective in preventing the growth of dendrite when the negative electrode active material is formed of metallic lithium only, and in preventing disintegration of the electrode or a lowering of Coulomb efficiency when the negative electrode active material is a lithium alloy. Then the cell can be increased in voltage, energy density and life.

The electrolyte solution constructing the cell of the invention is a solution of the electrolyte in the non-aqueous solvent mixture both defined as above. The electrolyte is preferably present in a concentration of 0.2 to 5 mol/liter, more preferably 0.5 to 3 mol/liter of the solvent mixture.

The secondary cell of the present invention is generally constructed by interposing the electrolyte solution between the positive and negative electrodes. A separator may be interposed between the positive and negative electrodes in order to prevent the electrodes from contacting each other to cause current shortcircuit. The separator is preferably a porous material which can be impregnated with and allow passage of the electrolyte solution, for example, woven and non-woven fabrics, nets and porous members of synthetic resins such as polytetrafluoroethylene, polypropylene, and polyethylene.

The non-aqueous liquid electrolyte cells of the present invention may be of any desired shapes including coin, cylindrical, box, and film shapes.

FIG. 1 shows one typical coin type secondary cell to which the present invention is applicable. The cell includes a positive electrode casing 1a and a negative electrode casing 1b which are mated together to define a cell space. An annular gasket 2 is interposed between the casings 1a and 1b to form a seal therebetween. A positive electrode 3, a separator 7, and a negative electrode 5 are disposed in the space between the positive and negative electrode casings 1a and 1b. A positive electrode collector 4 is disposed at the interface between the positive electrode 3 and its casing 1a while a negative electrode collector 6 is disposed at the interface between the negative electrode 5 and its casing 1b.

EXAMPLE

Examples of the present invention are given below by way of illustration and not by way of limitation. In the examples, mA is milliampere, V is volt, and H is hour.

Example 1

A net stainless steel SUS 444 as the polymerizing electrode and a platinum plate as the counter electrode were placed in an aqueous solution containing 1 mol/liter of aniline and 2 mol/liter of $HBF_4$. Electrolytic oxidative polymerization was carried out by applying constant current to the polymerizing electrode at a current density of 6 mA/cm$^2$. A polyaniline film deposited on the surface of the polymerizing electrode. The integral polyaniline/polymerizing electrode was washed with distilled water, thoroughly dried, and then punched to form a positive electrode disk having a diameter of 15 mm and a polyaniline weight of 50 mg.

A coin type secondary cell having a diameter of 20 mm and a thickness of 1.6 mm as shown in FIG. 1 was fabricated using the disk as the positive electrode 3, with the stainless steel serving as the positive electrode collector 4 which was joined to the positive casing 1a. The negative electrode 5 used was an electrochemically formed Li—Al alloy. The electrolyte solution used was a non-aqueous electrolyte solution containing 3 mol/liter of LiBF$_4$ in a solvent mixture of propylene carbonate and diethyl carbonate (50/50% by weight).

Example 2

A cell was fabricated by the same procedure as in Example 1 except that the solvent was prepared by adding diethyl carbonate to an equal-weight solvent mixture of propylene carbonate and ethylene carbonate (propylene carbonate:ethylene carbonate:diethyl carbonate=35:35:30% by weight).

Example 3

A cell was fabricated by the same procedure as in Example 1 except that the solvent was prepared by adding dimethyl carbonate to an equal-weight solvent mixture of propylene carbonate and ethylene carbonate (propylene carbonate:ethylene carbonate:dimethyl carbonate=35:35:30% by weight).

Comparative Example 1

For comparison purposes, a cell was fabricated by the same procedure as in Example 1 except that the electrolyte solution used contained 3 mol/liter of LiBF$_4$ in an equal-weight solvent mixture of propylene carbonate and ethylene carbonate.

The cells of Examples 1-3 and Comparative Example 1 were subjected to a charge/discharge test by charging with a constant current of 0.5 mA to an upper limit voltage of 3.3 V and then discharging at a constant current of 0.3 mA to a lower limit voltage of 2.0 V. The discharge capacity was determined from the quantity of electricity passed during the discharge period. The results are shown in Table 1 under the heading of initial discharge capacity.

Thereafter, the respective cells in charged state were discharged with constant currents of 0.1 mA and 0.05 mA to a lower limit voltage of 2.0 V at a low temperature of −20° C. The discharge capacity was determined from the quantity of electricity passed during the discharge period, evaluating the low-temperature discharge performance. The results are shown in FIG. 2.

Figure 2:
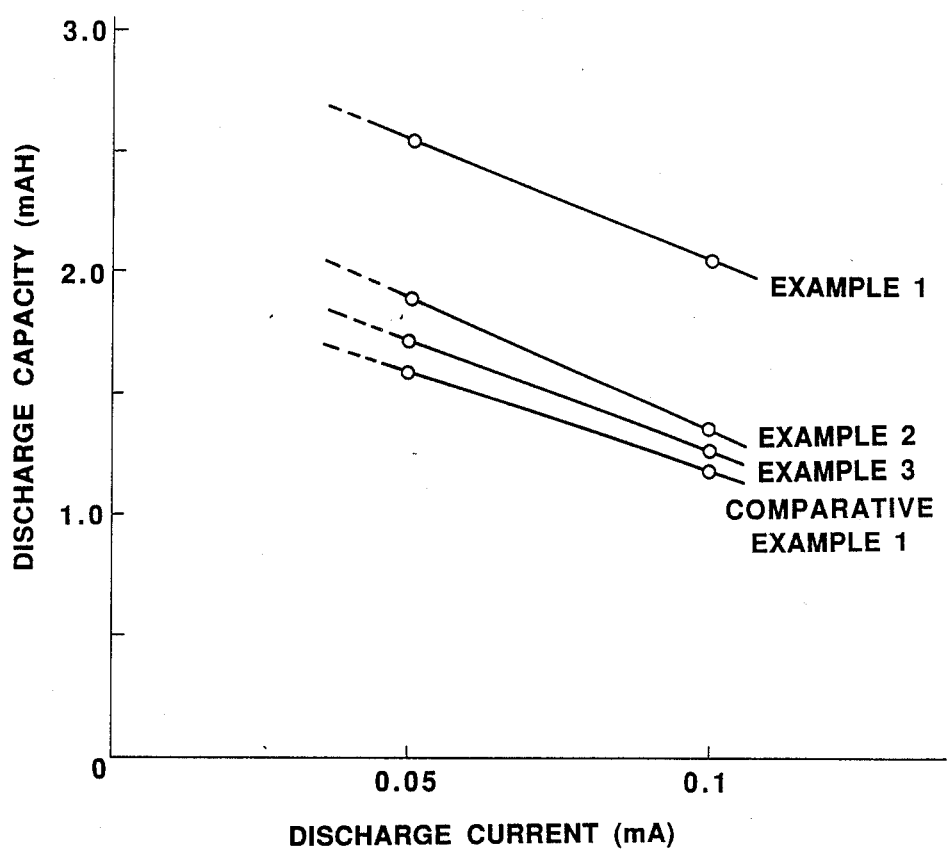
FIG. 2 is a diagram showing the discharge capacity vs. discharge current of the cells of Examples 1–3 and Comparative Example 1 at a low temperature of $-20°$ C.

As seen from FIG. 2, under the low-temperature conditions, the cells of Examples 1-3 provided a higher discharge capacity than the cell of Comparative Example 1. It is thus evident that the cells of the invention have improved discharge performance at low temperatures.

The respective cells were evaluated for continuous charging under a constant voltage by again charging to 3.3 V and continuing to apply a constant voltage of 3.3 V for 20 days at a high temperature of 60° C. The discharge capacity was measured at the end of the test. The results are also shown in Table 1. As is evident from Table 1, the cells of the invention show highly stable cell performance under high-voltage, high-temperature conditions.

TABLE 1

|  | Initial discharge capacity (mAH) | Discharge capacity after the test (mAH) |
|---|---|---|
| Example 1 | 4.6 | 4.6 |
| Example 2 | 4.6 | 4.6 |
| Example 3 | 4.6 | 4.5 |
| Comparative E1 | 4.6 | 4.6 |

Example 4

A cell was fabricated by the same procedure as in Example 1 except that the negative electrode used was a metallic lithium sheet of 300 μm thick punched to a diameter of 13 mm and the electrolyte solution used contained 1.5 mol/liter of LiPF$_6$ in a solvent mixture of ethylene carbonate and dimethyl carbonate (50:50% by weight).

Example 5

A cell was fabricated by the same procedure as in Example 4 except that a solvent mixture of propylene carbonate and diethyl carbonate (50:50% by weight) was used.

Example 6

A cell was fabricated by the same procedure as in Example 4 except that the solvent was prepared by adding benzene to an equal-weight solvent mixture of ethylene carbonate and dimethyl carbonate (ethylene carbonate:dimethyl carbonate:benzene=45:45:10% by weight).

Comparative Example 2

For comparison purposes, a cell was fabricated by the same procedure as in Example 4 except that the electrolyte solution contained 1.5 mol/liter of LiBF$_4$ in an equal-weight solvent mixture of propylene carbonate and dimethoxyethane.

The cells of Examples 4-6 and Comparative Example 2 were subjected to a repeated charge/discharge cycle test each cycle involving charging with a constant current of 0.5 mA to an upper limit voltage of 3.5 V and then discharging at a constant current of 0.3 mA to a lower limit voltage of 2.0 V. The discharge capacity of each cycle was determined from the quantity of electricity passed during the discharge period. The results are plotted in FIG. 3.

Figure 3:
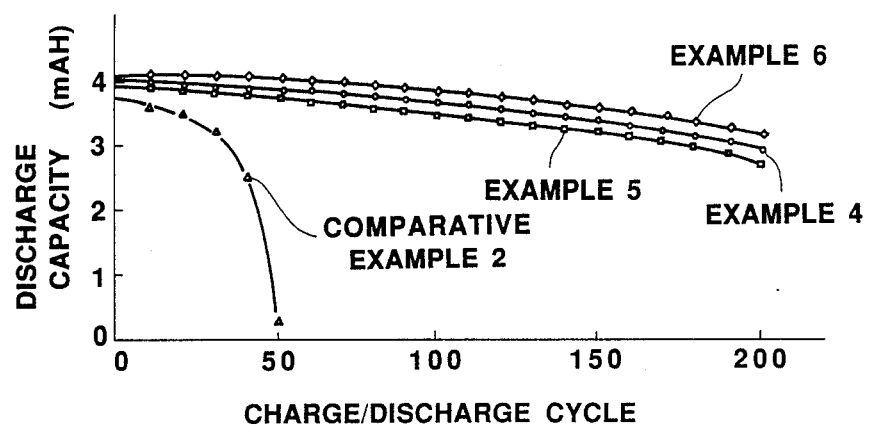
FIG. 3 is a diagram showing the discharge capacity vs. charge/discharge cycles of the cells of Examples 4–6 and Comparative Example 2.

As seen from FIG. 3, the cells of Examples 4-6 using a non-aqueous electrolyte solution having LiPF$_6$ dissolved in a mixture of non-cyclic and cyclic carbonates maintained approximately 60 to 70% of the initial discharge capacity over the 200 charge/discharge cycles. In contrast, the cell of Comparative Example 2 using a solvent mixture of propylene carbonate and dimethoxyethane for the electrolyte solution showed a sudden drop in discharge capacity at about 30 cycles and its capacity dropped to substantially zero at the 50-th cycle.

There has been described a non-aqueous liquid electrolyte cell comprising a positive electrode having an electroconductive organic polymer as a positive electrode active material and a negative electrode having lithium or a lithium alloy as a negative electrode active material wherein a non-aqueous electrolyte solution containing an electrolyte in a non-aqueous solvent mixture of a non-cyclic carbonate and a cyclic carbonate is present between the positive and negative electrodes. The cell has a practically satisfactory cell life on use at a substantial discharge capacity and maintains a sufficient discharge capacity at low temperatures. The cell offers a high voltage and a high energy density and shows an extended cycle life at a high discharge capacity when constructed as a secondary cell.

Although some preferred embodiments have been described, many modifications and variations may be made thereto in the light of the above teachings. It is therefore to be understood that within the scope of the appended claims, the invention may be practiced otherwise than as specifically described.

We claim:

1. A non-aqueous liquid electrolyte cell comprising
    a positive electrode having an electroconductive organic polymer as a positive electrode active material,
    a negative electrode having lithium or a lithium alloy as a negative electrode active material, and
    a non-aqueous electrolyte solution containing an electrolyte in a non-aqueous solvent mixture of a non-cyclic carbonate and a cyclic carbonate.

2. The cell of claim 1 wherein said electrolyte is selected from the group consisting of $LiBF_4$, $LiClO_4$, $LiPF_6$, $LiCF_3SO_3$, and $LiAsF_6$.

3. The cell of claim 1 or 2 which is a rechargeable secondary cell.

4. The cell of claim 1 wherein the electroconductive organic polymer comprises a polyaniline.

5. The cell of claim 1 wherein said non-cyclic carbonate is selected from the group consisting of dimethyl carbonate, diethyl carbonate, dipropyl carbonate, dibutyl carbonate, diphenyl carbonate, and a mixture thereof.

6. The cell of claim 1 or 5 wherein said cyclic carbonate is selected from the group consisting of ethylene carbonate, propylene carbonate, butylene carbonate, and a mixture thereof.

7. The cell of claim 1 wherein the proportion of non-cyclic carbonate to cyclic carbonate ranges from 1/5 to 5/1 in weight ratio.

8. The cell of claim 1 wherein the positive electrode includes a member disposed in direct or indirect contact with the positive electrode active material, said member being of a stainless steel having a chromium content of at least 16% by weight and a molybdenum content of at least 0.5% by weight.

9. The cell of claim 1 wherein the positive electrode includes a member disposed in direct or indirect contact with the positive electrode active material, said member being of a stainless steel having a chromium content of at least 16% by weight and a nickel content of less than 5% by weight.

* * * * *